US007693719B2

(12) United States Patent
Chu et al.

(10) Patent No.: US 7,693,719 B2

(45) Date of Patent: Apr. 6, 2010

(54) PROVIDING PERSONALIZED VOICE FONT FOR TEXT-TO-SPEECH APPLICATIONS

(75) Inventors: Min Chu, Beijing (CN); Yong Zhao, Beijing (CN); Sheng Zhao, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1044 days.

(21) Appl. No.: 10/977,178

(22) Filed: Oct. 29, 2004

(65) Prior Publication Data

US 2006/0095265 A1 May 4, 2006

(51) Int. Cl.
*G10L 21/00* (2006.01)
*G10L 13/00* (2006.01)
*G06F 3/16* (2006.01)

(52) U.S. Cl. .................... 704/270.1; 704/258; 715/727

(58) Field of Classification Search ...................... None
See application file for complete search history.

(56) References Cited

U.S. PATENT DOCUMENTS

| | | | | |
|---|---|---|---|---|
| 5,911,129 | A * | 6/1999 | Towell | 704/270.1 |
| 5,933,805 | A * | 8/1999 | Boss et al. | 704/249 |
| 6,289,085 | B1 * | 9/2001 | Miyashita et al. | 379/88.02 |
| 6,393,400 | B1 * | 5/2002 | Shigetomi et al. | 704/258 |
| 2003/0128859 | A1 * | 7/2003 | Greene et al. | 381/351 |
| 2004/0098266 | A1 * | 5/2004 | Hughes et al. | 704/277 |
| 2004/0111271 | A1 * | 6/2004 | Tischer | 704/277 |
| 2005/0108013 | A1 * | 5/2005 | Karns | 704/254 |
| 2007/0043574 | A1 * | 2/2007 | Coffman et al. | 704/275 |

* cited by examiner

*Primary Examiner*—David R Hudspeth
*Assistant Examiner*—Brian L Albertalli
(74) *Attorney, Agent, or Firm*—Lee & Hayes, PLLC

(57) ABSTRACT

A method for synthesizing speech from text includes receiving one or more waveforms characteristic of a voice of a person selected by a user, generating a personalized voice font based on the one or more waveforms, and delivering the personalized voice font to the user's computer, whereby speech can be synthesized from text, the speech being in the voice of the selected person, the speech being synthesized using the personalized voice font. A system includes a text-to-speech (TTS) application operable to generate a voice font based on speech waveforms transmitted from a client computer remotely accessing the TTS application.

28 Claims, 4 Drawing Sheets

PROVIDING PERSONALIZED VOICE FONT FOR TEXT-TO-SPEECH APPLICATIONS

BACKGROUND

Text-to-speech (TTS) is a technology that converts ASCII text into synthetic speech. The speech is produced in a voice that has predetermined characteristics, such as voice sound, tone, accent and inflection. These voice characteristics are embodied in a voice font. A voice font is typically made up of a set of computer-encoded speech segments having phonetic qualities that correspond to phonetic units that may be encountered in text. When a portion of text is converted, speech segments are selected by mapping each phonetic unit to the corresponding speech segment. The selected speech segments are then concatenated and output audibly through a computer speaker.

TTS is becoming common in many environments. A TTS application can be used with virtually any text-based application to audibly present text. For example, a TTS application can work with an email application to essentially "read" a user's email to the user. A TTS application may also work in conjunction with a text messaging application to present typed text in audible form. Such uses of TTS technology a reparticularly relevant to user's who are blind, or who are otherwise visually impaired, for whom reading typed text is difficult or impossible.

In traditional TTS systems, the user can choose a voice font from a number of pre-generated voice fonts. The available voice fonts typically include a limited set of female and/or male voices that are unknown to the user. The voice fonts available in traditional TTS systems are unsatisfactory to many users. Such unknown voices are not readily recognizable by the user or the user's family or friends. Thus, because these voices are unknown to the typical user, these voice fonts do not add as much value or be as meaningful to the user's listening experience as could otherwise be achieved.

SUMMARY

Implementations of systems and methods described herein enable a user to create a voice font corresponding to their own voice, or the voice of a known person of their choosing. The user, or other selected person, speaks predetermined utterances into a microphone connected to the user's computer. A TTS engine receives the encoded utterances and generates a personalized voice font based on the utterances. The TTS engine may reside on the user's computer or on a remote network computer that is in communication with the user's computer. The TTS engine can interface with text-based applications and use the personalized voice font to present text in an audible form in the voice of the user or selected known person.

DETAILED DESCRIPTION

Described herein are various implementations of systems and methods for generating a personalized voice font and using personalized voice fonts for performing text-to-speech (TTS). In accordance with various implementations described herein, a personalized voice font can be a private voice i.e., a voice font that corresponds to a voice of a person selected by a user or a celebrity voice font is a voice font that corresponds to a voice of a popular person. After the personalized voice font is generated, the user can select it, to have text audibly presented with the personalized voice font. The user may also select and download other personalized voice fonts or celebrity voice fonts.

In one implementation, a TTS engine resides on a remote computer that communicates with the user's computer. The user can download the TTS engine to the user's computer and thereby use the TTS engine locally. Alternatively, the user can access the TTS engine on the remote computer. Whether accessed locally or remotely, the TTS engine can be used to generate a personalized voice font and/or synthesize speech based on a selected voice font. In one implementation, a person of the user's choice speaks prepared statements into an audio input of a computer. The TTS engine uses the spoken statements to generate a personalized voice font. The personalized voice font can be automatically installed on the user's computer. As used herein, the term "speaker" refers to a person who is speaking, while the term "loudspeaker" refers to an audio output device often connected to a computer.

Figure 1:
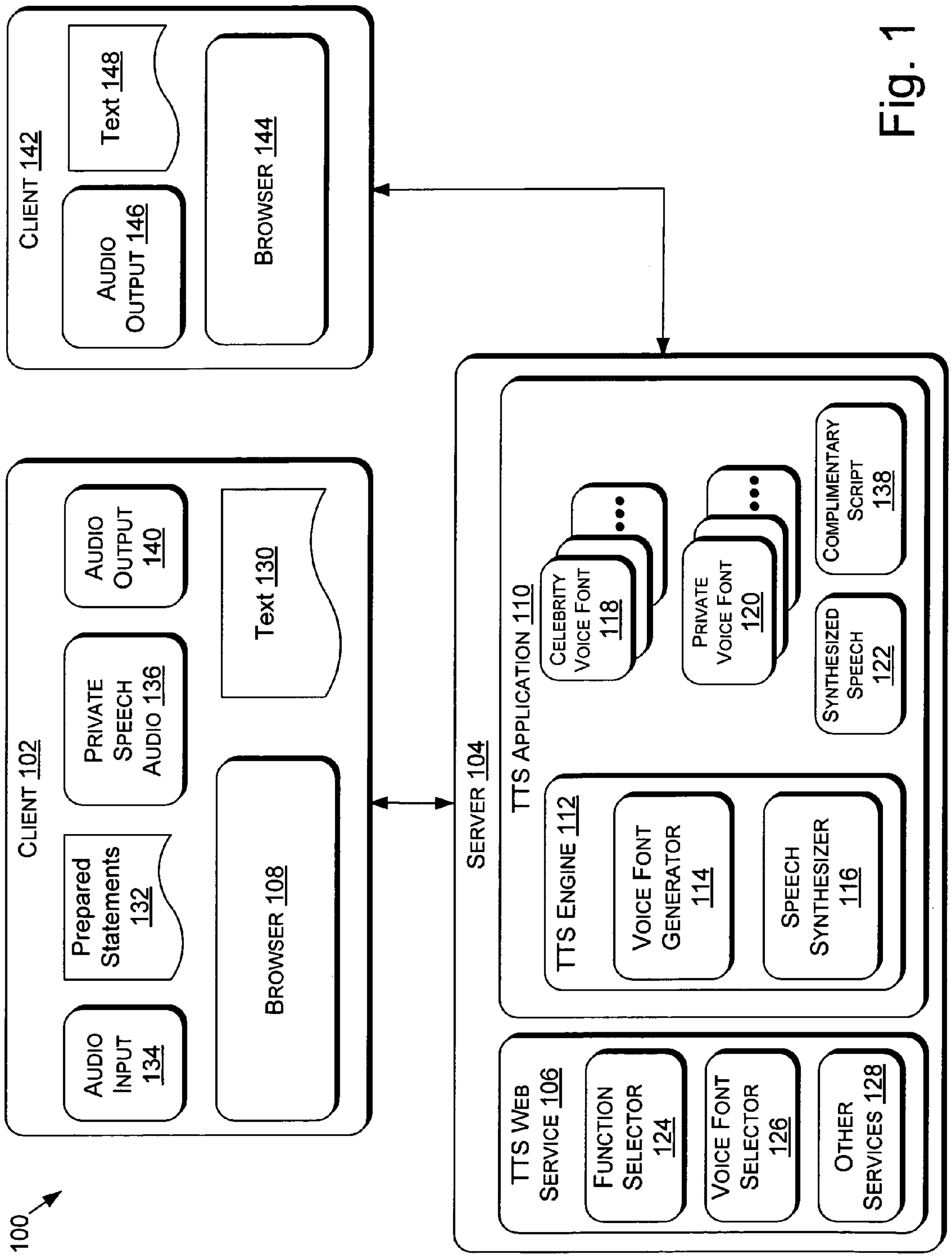
FIG. 1 illustrates an operating environment including a computing device for performing text-to-speech (TTS) in accordance with implementations described herein.

FIG. 1 illustrates an exemplary system 100 for generating and/or using voice fonts in a text-to-speech (TTS) process. The system 100 includes a number of computing devices, such as a client computer 102 and a server computer 104. In general, the client 102 interacts with a TTS web service 106 at the server 104 to perform various functions related to TTS. These functions include, but are not limited to, converting text to speech in a selected voice font, audibly outputting synthesized speech, generating a personalized voice font, or downloading selected TTS components or voice font for the user at the client 102.

In accordance with one implementation, a user at the client 102 accesses the TTS web service 106 using an Internet browser application 108 (i.e., browser). The browser 108 typically presents web pages to the user and provides utilities for the user to navigate among web pages, including by way of hyperlinks. Although the implementation illustrated in FIG. 1 includes a browser 108, it will be understood by those skilled in the art that other applications, in addition to, or other than, the browser 108 may be used to provide interaction with the TTS web service 106.

In accordance with one implementation of the TTS web service 106, access is provided to a TTS application 110 for performing TTS functions, such as generating personalized voice fonts and using a selected voice font for generating synthesized speech. As shown, the TTS application 110 includes a TTS engine 112. The TTS engine 112 includes a voice font generator 114 and a speech synthesizer 116. The voice font generator 114 can be used to generate celebrity voice fonts 118 and/or private voice fonts 120. After the voice fonts are generated, the speech synthesizer 116 converts text to synthesized speech 122 based on one of the voice fonts. The synthesized speech 122 can be in the form of an audio file, such as, but not limited to, ".wav", ".mp3", ".ra", or ".ram".

In accordance with a particular implementation of the TTS web service 106, web page(s) at the TTS web service 106 provide a user interface through which a user accesses the various components of the TTS application 110. The TTS web service includes a function selector 124, a voice font selector 126, and other services 128. The function selector 124 enables the client 102 to select a function (e.g., voice font generation, speech synthesis) provided by the TTS application 110.

The voice font selector 126 enables the client 102 to choose voice fonts (e.g., private voice font 120 or celebrity voice fonts 118) to use for speech synthesis and/or to download to the client 102. Other services 128 include, but are not limited to, TTS engine download, voice font download, and synthesized speech download, whereby the client 102 can download the TTS engine 112 (or components thereof), voice font(s) 118, 120, and synthesized speech 122, respectively.

Celebrity voice fonts 118 correspond to voices of publicly known people, such as, but not limited to, movie-stars, politicians, corporate officers, and musicians. Such celebrity voice fonts 118 may be used by the client 102 in a number of beneficial ways. For example, a user of the client 102 may have text read aloud in the voice of a preferred celebrity.

As another example, in one implementation, the client 102 is a server at a public information center for services or products. In this capacity, the client 102 is coupled to a telephone system and provides voice services to perhaps thousands of people who call the information center for information about the services or products. In this implementation, a different celebrity voice font 118 may be applied to each service or product to create a product/service-celebrity voice association. Such a product/service-celebrity voice association can build brand awareness or brand equity in the product.

Celebrity voice fonts 118 can be generated by a service or company (not shown) that stores the celebrity voice fonts 118 on the server 104. Typically, a celebrity voice font 118 is created by having the celebrity read a number of prepared statements that exemplify a range of speech characteristics. These statements are parsed and speech segments of the statements are associated with corresponding phonetic units used in the text to create the celebrity voice font 118. In accordance with one implementation, each celebrity voice font 118 may be purchased by the client 102 for a fee.

With regard to the private voice fonts 120, the client 102 causes the TTS application 110 to generate private voice fonts 120. When a user wants to have text 130 (e.g., text from the browser 108 or a text-based application, such as email) read to him in his voice or the voice of another selected person, such as a family member or friend, the user can have a private voice font 120 generated that corresponds to the selected person's voice.

To do this, the selected person speaks prepared statements 132 into an audio input 134 at the client 102 to generate private speech audio data 136 (e.g., a ".wav" file) associated with the speaker. The client 102 transmits the personalized speech audio data 136 to the TTS application 110. The voice font generator 114 of the TTS engine 112 generates a private voice font 120 corresponding to the personalized speech audio data 136. In accordance with one implementation, the TTS web service 106 automatically sends the generated private voice font 120 back to the client 102.

In accordance with one implementation of the voice font generator 114, the identity of the user (or speaker or client computer 102) is certified for security purposes. In this implementation, a public-private key may be appended to the private speech audio 136, so that the server 104 and/or the TTS application 110 can verify the user's identity. In addition, various encryption schemes can be used, such as hashing, to further ensure the security of the user's identity.

The prepared statements 132 include one or more statements that are representative of a range of phonetic speech characteristics. Typically, more statements can cover a wider range of phonetic speech characteristics. If the speaker does not speak clearly, or for some other reason the waveform is unclear (e.g., low signal-to-noise ratio), the TTS engine 112 will request that the speaker re-read the unclear statement.

In addition, the TTS engine 112 can generate a complimentary script 138 having one or more other statements that cover basic phonetic units if the prepared statements 132 do not include these basic phonetic units. The complimentary script 138 will be transmitted to the client 102, and the speaker will be requested to read the complimentary script 138 aloud to his audio device as the speaker did with the prepared statements.

The client 102 can use the TTS application 110 in different ways to synthesize speech from text 130. In accordance with one implementation, the client 102 first selects a voice font (e.g., a celebrity voice font 118 or a private voice font 120) using the voice font selector 126 at the TTS web service 106. The client 102 then uploads the text 130 to the TTS web service 106. The TTS web service 106 passes the text 130 to the TTS application 110 and indicates the selected voice font. The speech synthesizer 116 then converts the text 130 to speech using the selected voice font. The speech synthesizer 116 generates corresponding synthesized speech data 122 (e.g., a ".wav" file), which is sent back to the client 102. The client 102 outputs the synthesized speech data 122 via an audio output 140 (e.g, loudspeakers).

In accordance with another implementation, the client 102 instructs the TTS web service 106 to upload one or more components of the TTS application 110 to the client 102. Thus, for example, selected celebrity or personalized voice fonts may be uploaded to the client 102. In addition, if the client 102 does not have a TTS engine 112 for synthesizing speech, a copy of the TTS engine 112 (or component thereof) can be uploaded to the client 102. In this implementation, the client 102 can be charged a certain fee for any TTS components that are uploaded to the client 102.

Once the voice fonts and/or TTS engine 112 are installed on the client 102, they can be used locally to perform TTS on any text, such as, but not limited to, email text, text from a text messenger application, or text from a web site. The TTS engine 112 includes an application program interface (not shown) that enables communication between the TTS engine 112 and text-based applications (not shown).

Another client 142 is shown in FIG. 1 in order to illustrate that voice fonts and/or TTS application 110 components can be used by any number of client devices. Like the first client 102, the other client 142 can interact with the TTS web service 106 via a browser 144 in order to access functions of the TTS application 110. The client 142 may use the TTS components while they reside on the server 104, or the client 142 may download one or more of the TTS components to the client 142 for local use. The TTS web service 106 can be used beneficially in a multiple client configuration.

To illustrate a multiple client scenario, suppose the first client 102 is a user's desktop computer, and the other client 142 is the user's PDA, which is able to output audio via audio output 146. Using the desktop computer 102, the user first generates (as described herein) a private voice font 120 and stores the private voice font 120 at the TTS application 110. Later the private voice font 120 can be downloaded to the PDA 142. The PDA 142 may also use the TTS web service 106 to download components of the TTS engine 112. Using the TTS engine 112, text 146 at the PDA 142 is converted to synthesized speech based on the private voice font 120 that was generated from the desktop computer 102. The synthesized speech is output from the PDA 142 via audio output 146.

The computing devices shown in FIG. 1 may each be implemented with any of various types of computing devices known in the art, such as, but not limited to, a desktop computer, a laptop computer, a personal digital assistant (PDA), a handheld computer, or a cellular telephone. The clients 102 and 142 typically communicate with the server 104 via a network (not shown), which may be wired or wireless. In addition, although the terms client and server are used to describe the system 100, it is to be understood that the computing devices may be in configurations other that client/server, such as but not limited to, peer-to-peer configurations.

Figure 4:
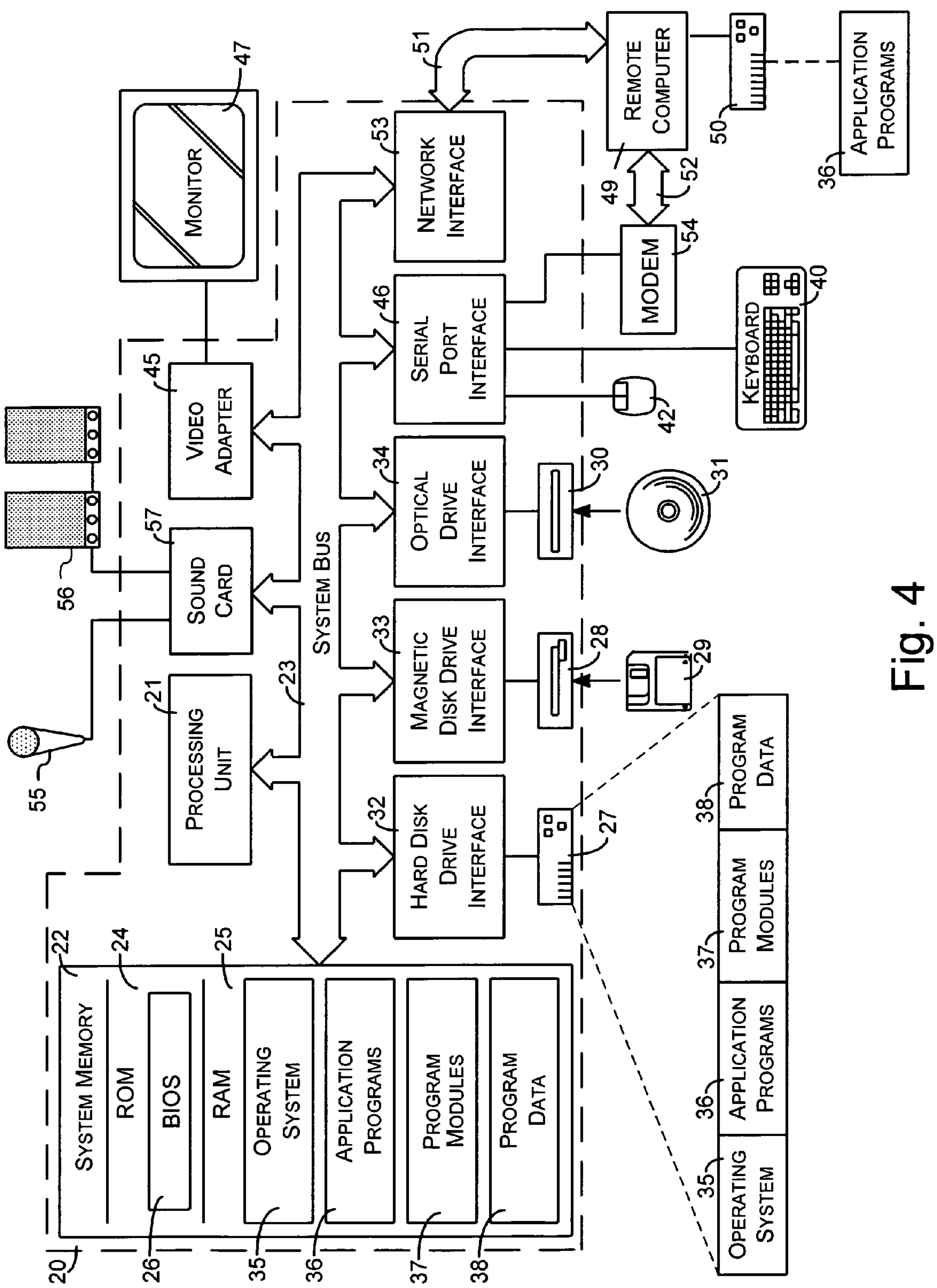
FIG. 4 illustrates a general purpose computer and environment that can be used to implement the text-to-speech functions and components described herein.

The components shown in FIG. 1 can be implemented in software or hardware or any combination of software or hardware. FIG. 4, discussed in detail below, illustrates a computing environment that may be used to implement the computing devices, applications, program modules, networks, and data discussed with respect to FIG. 1.

Exemplary Operations

Figure 2:
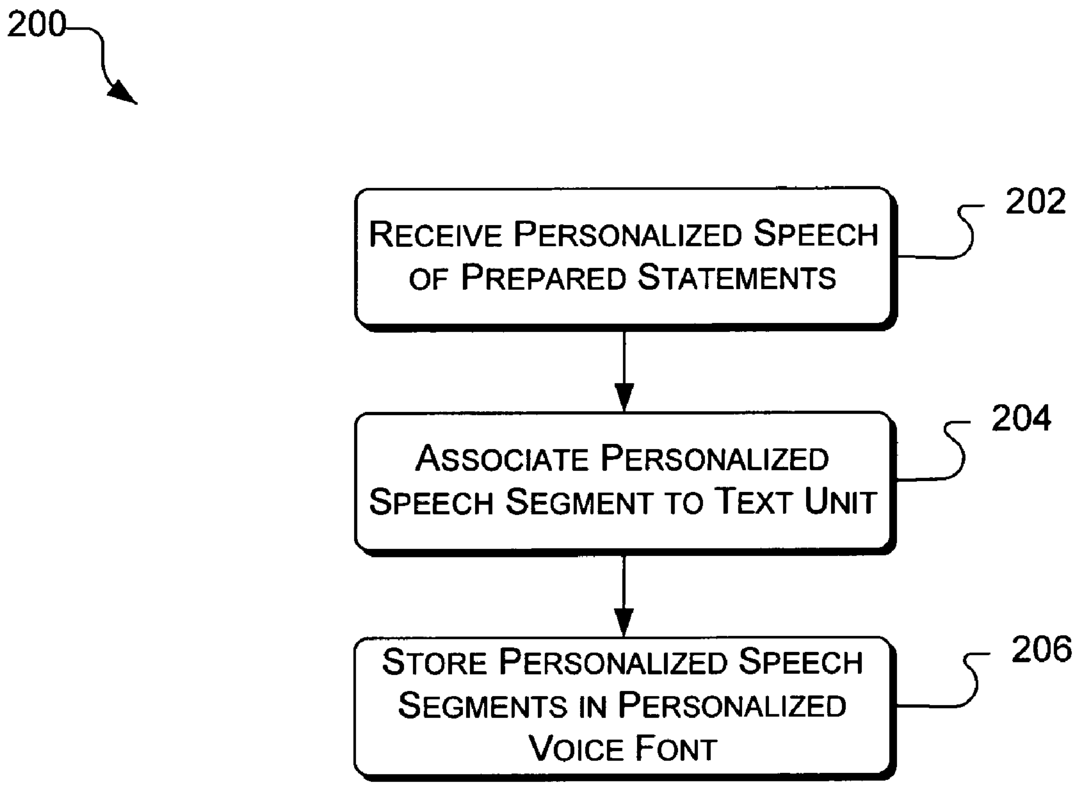
FIG. 2 illustrates an exemplary algorithm for generating a personalized voice font.

FIG. 2 illustrates an exemplary voice font generation algorithm 200 for generating a personalized voice font. The algorithm 200 may be carried out by the system shown in FIG. 1. Alternatively, the algorithm 200 may be carried out by systems other than the system shown in FIG. 1. Prior to the steps shown in FIG. 2, a user at a local computer accesses and/or downloads a TTS engine from a remote computer. The TTS engine is operable to generate a personalized voice font. Initially, the user, or a person of the user's choice, speaks prepared statements into the user's computer via an audio input (e.g., a microphone). The speaker's voice is encoded into personalized waveform(s), which may be stored in an audio file, such as a ".wav" file.

In a receiving operation 202 the encoded waveforms are received. When the TTS engine is on the remote computer, the receiving operation 202 receives the waveforms from a network. Alternatively, when the TTS engine is on the user's local computer, the waveforms are received locally via the computer bus. The user may be requested to repeat one or more portions of the prepared statements in certain circumstances, for example, if the speech was not clear. In addition, if the prepared statements do not cover a basic phonetic unit, a complementary script can be generated by the TTS engine. The TTS engine will request that the user read the complementary script to generate waveforms that cover the basic phonetic unit.

An associating operation 204 associates basic segments of the personalized speech waveforms with corresponding basic phonetic units to create the personalized voice font. In one implementation, the associating operation 204 parses the prepared statements into basic units, such as phonemes, diphones, semi-syllables, or syllables. These units may further be classified by prosodic characteristics, such as rhythms, intonations, and so on.

These basic phonetic units are identified in some manner, for example, and without limitation, by an associated diphone, triphone, semi-syllable, or syllable. Each type of identifier has its own characteristics. With regard to diphones, a diphone unit is composed of units that begin in the middle of the stable state of a phone and end in the middle of the following one. Triphones differ from diphones in that triphones include a complete central phone, and are classified by their left and right context phones. Semi-syllables or syllables are often used in Chinese since the special feature of Chinese is one syllable for each character. The identified basic units are then associated with the corresponding segments in the waveform.

As discussed above, for any basic phonetic units that are missing from the prepared statements, the TTS engine will provide a complimentary script that includes the missing basic phonetic units. In this fashion, all possible phonetic units will be associated with a personalized speech segment, and identified in the voice font.

In one exemplary implementation of the associating operation 204, the basic phonetic units are associated with corresponding speech segments in a data structure. An exemplary data structure is a table organized as shown in Table 1:

TABLE 1

Exemplary association of identified basic phonetic units with personalized speech segments

| Unit Identifier | Speech Segment |
|---|---|
| Unit ID 1 | Speech Segment 1 |
| . . . | . . . |
| Unit ID n | Speech Segment n |

Table 1 includes a first column of unit identifiers that uniquely identify each basic phonetic used in text, and a second column of corresponding speech segments. Each unit ID can have more than one corresponding speech segment; i.e., each basic unit can have several candidate segments for unit selection. Thus, for example, text ID 1 corresponds to speech segment 1, and so on. Those skilled in the art will recognize various ways of identifying the basic phonetic units (e.g., diphone, triphone, semi-syllable, syllable, etc.).

A storing operation 206 stores the personalized voice font. In one implementation, the personalized voice font is stored on the remote computer. In another implementation, the personalized voice font is stored on the user's local computer. Storing the personalized voice font on the user's local computer may involve transmitting the personalized voice font from the remote computer to the user's local computer. In addition, the user may specify that the personalized voice font be transmitted to another computing device, such as the user's PDA, cell phone, handheld computer, and so on.

Figure 3:
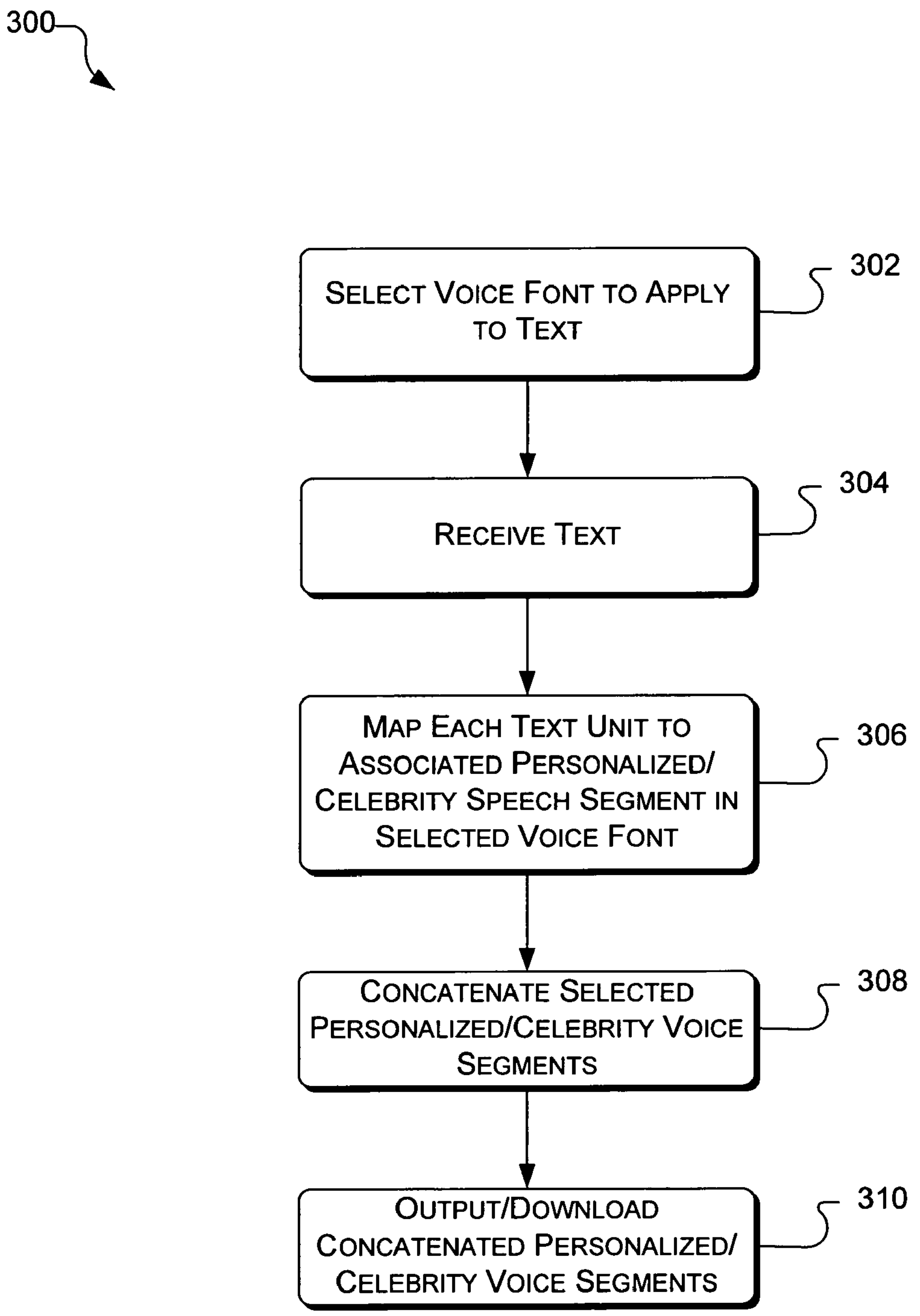
FIG. 3 illustrates and exemplary algorithm for selecting and using a personalized or celebrity voice font to audibly present text in a TTS process.

FIG. 3 illustrates and exemplary voice font selection and application algorithm 300 for selecting and using a personalized voice font to audibly present text in a TTS process. The algorithm 300 may be carried out by the systems shown in FIG. 1. Alternatively, the algorithm 300 may be carried out by systems other than those shown in FIG. 1. A TTS application is typically used in conjunction with a text-based application (e.g., email, text messenger, etc.). When text is received in the text-based application, the text can be automatically output with synthesized speech or the user may manually control the output of the synthesized speech.

Initially, a selecting operation 302 selects a voice font to apply to the text. The selecting operation 302 is based on the user's choice of voice font, or the voice font can be set to a default voice font. For example, a default voice font may be a celebrity voice font. The user can select a different voice font, such as another celebrity voice font or a private voice font. The selected voice font will be applied to text in the text-based application.

A receiving operation 304 receives text from the text-based application. Receiving could involve receiving an email message in the text-based application. In addition, receiving could involve referencing some particular text for which synthesized speech is desired. For example, the user could reference a text-based story at some location (e.g., memory, the Internet) that the user wants the TTS application to "read" to the user.

A mapping operation 306 maps each phonetic unit used in the text to an associated speech segment in the selected voice font. In one implementation, the text is parsed and basic phonetic units are identified. The identified basic units can then be looked up in a table, such as Table 1 shown above. A speech segment corresponding to each identified basic phonetic unit is selected from the table. When more than one speech segments are associated to a basic unit, more complete unit selection methods can be used.

Other implementations of the mapping operation 306 utilize systems and methods described in U.S. patent application Ser. No. 09/850,527 and U.S. patent application Ser. No. 10/662,985, both entitled "Method and Apparatus for Speech Synthesis Without Prosody Modification", and assigned to the assignee of the present application. Implementations of these systems and methods provide a multi-tier selection mechanism for selecting a set of samples that will produce the most natural sounding speech.

A concatenating operation 308 concatenates the selected speech segments into a chain according to the order of the basic phonetic units in the text. The concatenating operation 308 performs a smoothing operation at the concatenation boundary when needed. This chain is typically stored in an audio file having an audio format. For example, the chain may be stored in a ".wav" file.

An output or downloading operation 310 downloads and/or outputs the concatenated speech segments. If the speech segments were concatenated on a remote computer, the resulting audio file is downloaded from the remote computer to the user's computer. When the user's computer receives the audio file, the audio data from the file is output via an audio output, such as loudspeakers.

Exemplary Computing Device

With reference to FIG. 4, an exemplary system for implementing the operations described herein includes a general-purpose computing device in the form of a conventional personal computer 20, including a processing unit 21, a system memory 22, and a system bus 23. System bus 23 links together various system components including system memory 22 and processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system 26 (BIOS), containing the basic routine that helps to transfer information between elements within the personal computer 20, such as during start-up, is stored in ROM 24.

As depicted, in this example personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM, DVD, or other like optical media. Hard disk drive 27, magnetic disk drive 28, and optical disk drive 30 are connected to the system bus 23 by a hard disk drive interface 32, a magnetic disk drive interface 33, and an optical drive interface 34, respectively. These exemplary drives and their associated computer-readable media provide nonvolatile storage of computer readable instructions, data structures, computer programs and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs), read only memories (ROMs), and the like, may also be used in the exemplary operating environment.

A number of computer programs may be stored on the hard disk, magnetic disk 29, optical disk 31, ROM 24 or RAM 25, including an operating system 35, one or more application programs 36, other programs 37, and program data 38. A user may enter commands and information into the personal computer 20 through input devices such as a keyboard 40 and pointing device 42 (such as a mouse).

Particularly relevant to the present application are a microphone 55 and loudspeakers 56, which may also be connected to the computer 20. The microphone 55 is capable of capturing audio data, such as a speaker's voice. The audio data is input into the computer 20 via a sound card 57, or other appropriate audio interface. In this example, sound card 57 is connected to the system bus 23, thereby allowing the audio data to be routed to and stored in the RAM 25, or one of the other data storage devices associated with the computer 20, and/or sent to remote computer 49 via a network. The loudspeakers 56 play back digitized audio, such as the speaker's digitized voice or synthesized speech created from a voice font. The digitized audio is output through the sound card 57, or other appropriate audio interface.

Other input devices (not shown) may include a joystick, game pad, satellite dish, scanner, or the like. These and other input devices are often connected to the processing unit 21 through a serial port interface 46 that is coupled to the system bus, but may be connected by other interfaces, such as a parallel port, game port, a universal serial bus (USB), etc.

A monitor 47 or other type of display device is also connected to the system bus 23 via an interface, such as a video adapter 45. In addition to the monitor, personal computers typically include other peripheral output devices (not shown), such as printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the personal computer 20.

The logical connections depicted in FIG. 4 include a local area network (LAN) 51 and a wide area network (WAN) 52. Such networking environments are commonplace in offices, enterprise-wide computer networks, Intranets and the Internet.

When used in a LAN networking environment, personal computer 20 is connected to local network 51 through a network interface or adapter 53. When used in a WAN networking environment, the personal computer 20 typically includes a modem 54 or other means for establishing communications over the wide area network 52, such as the Internet. Modem 54, which may be internal or external, is connected to system bus 23 via the serial port interface 46.

In a networked environment, computer programs depicted relative to personal computer 20, or portions thereof, may be stored in a remote memory storage device. It will be appreciated that the network connections shown are exemplary and other means of establishing a communications link between the computers may be used.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer-readable media. Computer-readable media can be any available media that can be accessed by a computer. By way of example, and not limitation, computer-readable media may comprise "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

Although the exemplary operating embodiment is described in terms of operational flows in a conventional computer, one skilled in the art will realize that the present invention can be embodied in any platform or environment that processes and/or communicates video signals. Examples include both programmable and non-programmable devices such as hardware having a dedicated purpose such as video conferencing, firmware, semiconductor devices, hand-held computers, palm-sized computers, cellular telephones, and the like.

Although some exemplary methods and systems have been illustrated in the accompanying drawings and described in the foregoing Detailed Description, it will be understood that the methods and systems shown and described are not limited to the particular implementation described herein, but rather are capable of numerous rearrangements, modifications and substitutions without departing from the spirit set forth herein.

What is claimed is:

1. A method implemented on a computing device having instructions executable by a processor for synthesizing speech from a text, the speech being in a specified voice, the method comprising:

accessing a text-to-speech application through a browser in communication with a network by a user of a client computer;

generating a personalized voice font based on the one or more waveforms, wherein the user creates a personalized speech audio data at the client computer by speaking a plurality of predetermined utterances into a microphone connected to the client computer, the personalized speech audio data is encoded into a waveform at the client computer, and the waveform is transmitted to a voice font generator of the text-to-speech application over the network, wherein generating the personal voice font after the waveform is transmitted to the voice font generator comprises:

associating the personalized speech audio data transmitted to the voice font generator with corresponding basic phonetic units, wherein the plurality of predetermined utterances is parsed into one or more basic phonetic units comprising at least one of phonemes, diphones, semi-syllables, or syllables, identifying the one or more basic phonetic units based on corresponding characteristics of a basic phonetic unit, and associating the one or more basic phonetic units with corresponding segments of the waveform in a data structure, wherein the data structure comprises a table having one column correspond to one or more identifiers of the one or more basic phonetic units, and having another column correspond to the segments of the waveform, wherein each identifier corresponds to one or more segments of the waveform in the table;

selecting the personalized voice font, wherein a selection is made by the user via the browser of the client computer;

receiving through the browser of the client computer one or more waveforms characteristic of a voice of a person selected by the user;

submitting the text from the user's client computer via the browser to the text-to-speech application;

synthesizing speech in the text-to-speech application based on the selected personalized voice font;

concatenating the personalized voice font into a chain according to an order of basic phonetic units in the text, the basic phonetic units are parsed into phonemes, diphones, semi-syllables, or syllables and identified by an associated diphone, a triphone, a semi-syllable, or a syllable that is associated with a corresponding segment in a waveform;

downloading concatenated speech segments from a remote computer to the client computer;

transmitting synthesized speech back to the user of the client computer through the browser; and delivering to the user from the text-to-speech application through the browser of the client computer the personalized voice font, whereby speech can be synthesized from text, the speech being in the voice of the selected person, the speech being synthesized using the personalized voice font.

2. A method as recited in claim 1 wherein the receiving comprises receiving the one or more waveforms via a network connected to the user's computer.

3. A method as recited in claim 1 wherein delivering comprises transmitting the voice font to the user's computer via a network.

4. A method as recited in claim 1 further comprising certifying the identity of the user by associating a public-private key with a private voice font correlated to a selected person.

5. A method as recited in claim 1 wherein the voice font is embodied in a data structure that associates basic text units with corresponding speech segments.

6. A method as recited in claim 1 wherein the selected person is the user.

7. A method as recited in claim 1 further comprising enabling the user to select the personalized voice font from a plurality of voice fonts.

8. A method as recited in claim 1 further comprising delivering a text-to-speech (TTS) engine to the user's computer, the TTS engine being operable to synthesize the speech based on the personalized voice font.

9. A method as recited in claim 1 further comprising requesting an additional waveform from the selected person.

10. A method as recited in claim 1, wherein the one or more waveforms are based on one or more prepared statements spoken by the selected person, the method further comprising, generating a script including one or more additional statements that cover a basic phonetic unit that is not covered by the prepared statements.

11. A method as recited in claim 1 wherein the personalized voice font is configured for use by a text-to-speech (TTS) engine that communicates with a text-based application program to synthesize speech based on text from the text-based application program.

12. A method as recited in claim 1 wherein delivering comprise transmitting the personalized voice font to at least one of the following devices:

a personal digital assistant;

a cellular phone;

a desktop computer;

a laptop computer;

a handheld computer.

13. A computer-readable storage medium for storing computer-executable instructions that, when executed, cause a computer to perform a process comprising:

receiving via a microphone at a user's computer, audio input corresponding to a voice of a selected speaker, wherein a personalized speech audio data is created by speaking a plurality of predetermined utterances into the microphone of the user's computer;

encoding the audio input into a waveform;

generating a personalized voice font based on the waveform;

accessing a text-to-speech application through a browser on the user's computer, wherein the browser is in communication with a network;

transmitting the waveform to a voice font generator of a text-to-speech (TTS) engine residing on a remote computer that is in communication with the browser of the user's computer via the network to generate the personalized voice font, wherein generating the personalized voice font after transmitting the waveform to the voice font generator comprises:

associating the personalized speech audio data transmitted to the voice font generator with corresponding basic phonetic units, wherein the plurality of predetermined utterances is parsed into one or more basic phonetic units comprising at least one of phonemes, diphones, semi-syllables, or syllables, identifying the one or more basic phonetic units based on corresponding characteristics of a basic phonetic unit, and associating the one or more basic phonetic units with corresponding segments of the waveform in a data structure, wherein the data structure comprises a table having one column correspond to one or more identifiers of the one or more basic phonetic units, and having another column correspond to the segments of the waveform, wherein each identifier corresponds to one or more segments of the waveform in the table;

transmitting a text from the user's computer to the TTS engine via the network;

selecting the personalized voice font using a voice font selector, wherein the voice font selector is in communication with the browser of the user's computer via the network;

instructing the TTS engine to generate synthesized speech based on the text transmitted to the TTS engine;

concatenating the personalized voice font into a chain according to an order of the basic phonetic units in the text, the basic phonetic units are parsed into phonemes, diphones, semi-syllables, or syllables and identified by an associated diphone, a triphone, a semi-syllable, or a syllable that is associated with a corresponding segment in a waveform;

downloading concatenated speech segments to the user's computer; and receiving to the user's computer via the network synthesized speech from the TTS engine, the synthesized speech corresponding to the text and being synthesized with the personalized voice font representative of the selected speaker's voice.

14. A computer-readable storage medium as recited in claim 13, the process further comprising instructing the TTS engine to select the personalized voice font from a plurality of voice fonts.

15. A computer-readable storage medium as recited in claim 13, the process further comprising transmitting the personalized voice font to either the user's computer or another computer in communication with the remote computer.

16. A computer-readable storage medium as recited in claim 13 wherein receiving audio input comprises receiving spoken statements from the person, the statements being prepared statements that cover a range of basic phonetic units.

17. A computer-readable storage medium as recited in claim 13, the process further comprising generating a script having statements for the speaker.

18. A computer-readable storage medium as recited in claim 13, the process further comprising generating, by the TTS engine, the personalized voice font.

19. A computer-readable storage medium as recited in claim 13, the process further comprising:

requesting a voice font from a set of celebrity voice fonts and a set of personalized voice fonts;

receiving the requested voice font;

applying the requested voice font to text such that speech corresponding to the text is synthesized using the selected voice font.

20. A computer-readable storage medium as recited in claim 13, the process further comprising certifying the identity of the speaker by associating a public-private key with a private voice font correlated to a selected person.

21. A computer-readable storage medium as recited in claim 13, wherein the speaker is selected from a group comprising:

the user;

a friend of the user;

a family member of the user.

22. A computer-readable storage medium as recited in claim 13, the process further comprising outputting audio based on the synthesized speech at the user's computer.

23. A system for synthesizing speech from a text comprising:

a server in communication via a network, with a browser on a client computer of a user;

a text-to-speech (TTS) application, in communication with the client computer of the user, operable to generate a voice font based on speech waveforms, wherein the user creates a personalized speech audio data on the client computer, and the personalized speech audio data is encoded into one or more waveforms at the client computer, wherein the waveforms are transmitted from the client computer remotely accessing a voice font generator of the TTS application via the network, wherein generating the voice font after the waveforms are transmitted comprises:

associating the waveforms transmitted to the voice font generator with corresponding basic phonetic units, wherein the plurality of predetermined utterances is parsed into one or more basic phonetic units comprising at least one of phonemes, diphones, semi-syllables, or syllables, identifying the one or more basic phonetic units based on corresponding characteristics of a basic phonetic unit, and associating the one or more basic phonetic units with corresponding segments of the waveforms in a data structure, wherein the data structure comprises a table having one column correspond to one or more identifiers of the one or more basic phonetic units, and having another column correspond to the segments of the waveforms, wherein each identifier corresponds to one or more segments of the waveforms in the table;

a text to speech engine to concatenate a personalized voice font into a chain according to an order of the basic phonetic units in the text, the basic phonetic units are parsed into phonemes, diphones, semi-syllables, or syllables and identified by an associated diphone, a triphone, a semi-syllable, or a syllable that is associated with a corresponding segment in a waveform;

the text to speech engine to download concatenated speech segments to the client computer; and a TTS web service having a user interface, wherein the user interface is a function selector, a voice font selector and other services configured to allow a user to remotely perform text-to-speech through the network.

24. A system as recited in claim 23 wherein the TTS web service controls the client computer's access to the TTS application.

25. A system as recited in claim 23 wherein the TTS application comprises one or more celebrity voice fonts based on speech from celebrities.

26. A system as recited in claim 23 wherein the TTS application comprises one or more personalized voice fonts that can be selected for use by the user of the client computer.

27. A system as recited in claim 23 wherein the TTS application comprises one or more voice fonts that can be downloaded to another computer in communication with the TTS application.

28. A system as recited in claim 23 wherein the TTS application comprises a TTS engine, the TTS engine including a speech synthesizer operable to convert specified text to speech in a voice corresponding to the generated voice font.

* * * * *